No. 799,576. PATENTED SEPT. 12, 1905.
A. B. ROBBINS.
EYEGLASS HOLDER.
APPLICATION FILED MAY 19, 1904.

WITNESSES.
INVENTOR
ANDREW B. ROBBINS.
HIS ATTORNEYS.

UNITED STATES PATENT OFFICE.

ANDREW B. ROBBINS, OF ROBBINSDALE, MINNESOTA.

EYEGLASS-HOLDER.

No. 799,576. Specification of Letters Patent. Patented Sept. 12, 1905.

Application filed May 19, 1904. Serial No. 208,651.

*To all whom it may concern:*

Be it known that I, ANDREW B. ROBBINS, of Robbinsdale, in the county of Hennepin, State of Minnesota, have invented certain new and useful Improvements in Eyeglass-Holders, of which the following is a specification.

This invention relates to improvements in eyeglass-holders; and the object of the invention is to provide a holder that rests upon and fits to the bridge of the nose of the wearer instead of clasping or pressing against the sides of the nose, as is done in all holders with which I am familiar.

The invention consists generally in an eyeglass-holder comprising a nose-clamp formed of two parts centrally hinged together and shaped to fit the bridge of the nose of the wearer, with a light spring engaging the two parts of the clamp.

The invention consists, further, in the constructions and combinations hereinafter described, and particularly pointed out in the claims.

Figure 1:
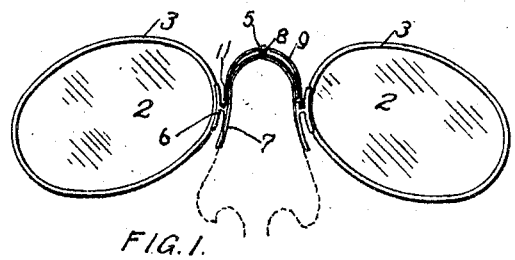
Figure 2:
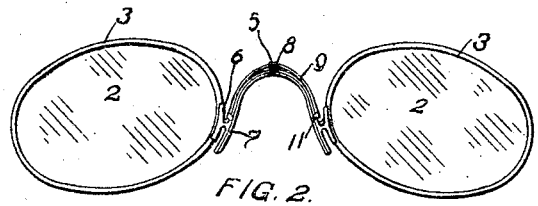
Figure 3:
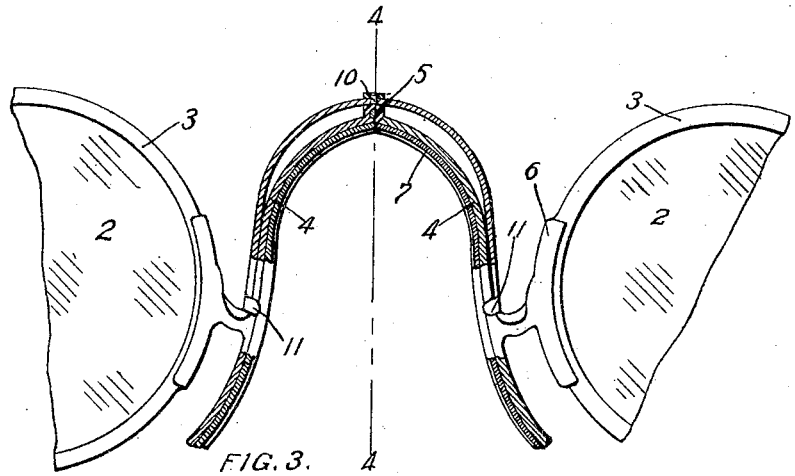
Figure 5:
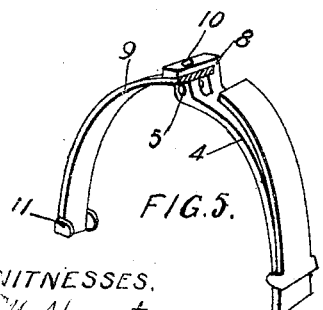
Figures 4, 6:
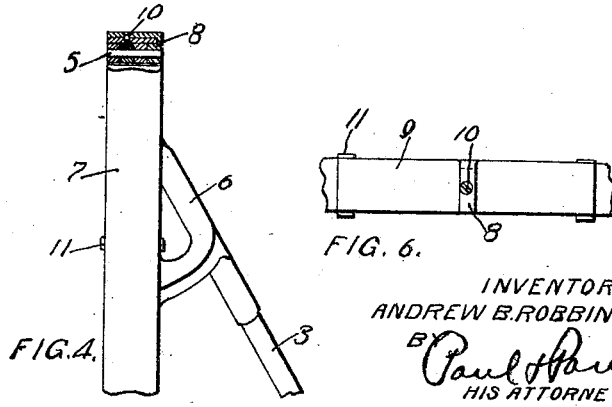

In the accompanying drawings, forming part of this specification, Figure 1 is a front elevation of a pair of eyeglasses embodying my invention, the outline of the nose of the wearer being indicated by dotted lines. Fig. 2 is a similar view showing the glasses separated, the parts of the clamp being spread in position for application to the nose of the wearer. Fig. 3 is a sectional elevation through the clamp and spring, a portion of each glass being shown in elevation. Fig. 4 is a vertical section on line 4 4 of Fig. 3. Fig. 5 is a perspective showing a portion of the clamp and the spring. Fig. 6 is a top view of the spring and portion of the clamp to which the spring is secured.

In the drawings, 2 2 represent the glasses, which may be secured in the frames 3, or, if preferred, the frames might be omitted and the lenses connected directly by suitable clips to the nose-clamp. The nose-clamp consists of the two parts 4 4, hinged together at 5 and supporting the lenses by the clips 6, which may be connected to the frames 3, as shown, or which, as already stated, might be connected directly to the lenses. The clamp is formed of thin metal capable of being bent by use of pliers or other suitable means to conform to the outline of the bridge of the nose of the wearer. Cemented or otherwise suitably secured upon the inside of the nose-clamp is a pad 7, of soft leather or other suitable material. This pad, as shown in Fig. 4, is preferably slightly concave upon its inner surface. By making the pad concave in this manner a partial vacuum is created when the device is in use between the pad and the surface of the nose of the wearer, and the clamp is thereby more firmly held in place. Upon one part of the clamp, just above the hinge, I form a lug 8, in which is a slot adapted to receive a thin flat spring 9. This spring may be secured in the slot by a screw 10 passing through the lug and through the spring, or it may be secured by any other suitable means. The ends of the spring 9 press upon the outside of the parts of the clamp 4, and, if preferred, the ends of the spring may be provided with the inturned lugs 11, which fit over the edges of the clamp. These lugs are not, however, considered essential and may be omitted, if preferred, as the connection between the ends of the spring and the clamp is free or loose, so that there may be a slight play of one on the other.

In using this device it is designed to have the parts of the clamp 4 shaped so as to fit and rest upon the bridge of the nose of the wearer. The spring 9 pressing inward upon the parts of the clamp causes a light pressure against the nose for practically the full length of each part of the clamp. The weight of the glasses is borne upon the top of the bridge of the nose, and hence a very light pressure upon the sides of the nose keeps the glasses in place. Ordinarily where the only contact with the nose is through the pads that engage the sides of the nose the pressure upon the sides must be sufficient to sustain the entire weight of the glasses. With my invention, however, the weight is not borne through the pressure upon the sides of the nose, but upon the top of the bridge of the nose, with which the top of the clamp is in contact.

I claim as my invention—

1. The combination, in an eyeglass-holder, of a nose-clamp consisting of two parts hinged together at the center and adapted to fit and rest upon the top and the sides of the bridge of the nose of the wearer, and a spring secured above the hinge of said clamp and extending over and engaging each part of the clamp, substantially as described.

2. The combination, in an eyeglass-holder, with a nose-clamp consisting of two parts adapted to fit and rest upon the top and the sides of the bridge of the nose of the wearer, and a pad secured upon the inner surface of said clamp, of a spring secured to said clamp above said hinge and extending over and bearing upon each part of said clamp, substantially as described.

3. The combination, in an eyeglass-holder, with a nose clamp consisting of two parts hinged together and adapted to fit and rest upon the top and the sides of the bridge of the nose of the wearer, and a pad secured upon the inner surface of said clamp and provided with a concave surface, of a spring secured to said clamp above said hinge and extending over and engaging each part of said clamp, substantially as described.

4. The combination, in an eyeglass-holder, of a nose-clamp consisting of two parts hinged together at the center and adapted to fit and rest upon the top and the sides of the bridge of the nose of the wearer, and a spring secured above the hinge of said clamp and extending over and slidably engaging each part of the clamp on the sides next to the eyeglass-frame, substantially as described.

In witness whereof I have hereunto set my hand this 25th day of April, 1904.

ANDREW B. ROBBINS.

In presence of—
 A. C. PAUL,
 C. G. HANSON.